US005864868A

United States Patent [19]

Contois

[11] Patent Number: 5,864,868
[45] Date of Patent: Jan. 26, 1999

[54] COMPUTER CONTROL SYSTEM AND USER INTERFACE FOR MEDIA PLAYING DEVICES

[76] Inventor: David C. Contois, 217 Pearl St., Essex Jct., Vt. 05452

[21] Appl. No.: 600,328

[22] Filed: Feb. 13, 1996

[51] Int. Cl.[6] .................................................. G06F 17/30
[52] U.S. Cl. .............................. 707/104; 84/609; 84/610; 84/622
[58] Field of Search ..................................... 364/130, 400; 235/375; 395/902, 328, 615; 194/217; 84/602, 462, 609, 610, 622, 726; 369/30; 379/101.01; 707/104

[56] References Cited

U.S. PATENT DOCUMENTS

| | | | |
|---|---|---|---|
| 4,104,950 | 8/1978 | Finley | 84/462 |
| 4,351,221 | 9/1982 | Starnes | 84/609 |
| 4,667,802 | 5/1987 | Verduin et al. | 194/217 |
| 4,744,281 | 5/1988 | Sozaki . | |
| 4,766,581 | 8/1988 | Korn et al. | 369/30 |
| 4,790,230 | 12/1988 | Sanderson | 84/462 |
| 5,046,004 | 9/1991 | Tsumura et al. . | |
| 5,083,491 | 1/1992 | Field . | |
| 5,127,303 | 7/1992 | Tsumura et al. | 84/609 |
| 5,142,961 | 9/1992 | Paroutaud . | |
| 5,146,833 | 9/1992 | Lui . | |
| 5,153,829 | 10/1992 | Furuya et al. . | |
| 5,194,682 | 3/1993 | Okamura et al. . | |
| 5,208,421 | 5/1993 | Lisle et al. . | |
| 5,212,733 | 5/1993 | DeVitt et al. . | |
| 5,237,157 | 8/1993 | Kaplan | 395/210 |
| 5,247,126 | 9/1993 | Okamura et al. . | |
| 5,262,940 | 11/1993 | Sussman . | |
| 5,266,735 | 11/1993 | Shaffer et al. | 84/609 |
| 5,281,754 | 1/1994 | Farrett et al. . | |
| 5,283,638 | 2/1994 | Engnerg et al. . | |
| 5,286,907 | 2/1994 | Okamura et al. . | |
| 5,307,456 | 4/1994 | MacKay | 395/328 |
| 5,317,732 | 5/1994 | Gerlach, Jr. et al. . | |
| 5,355,762 | 10/1994 | Tabata | 84/609 |
| 5,388,264 | 2/1995 | Tobias, II et al. . | |
| 5,390,138 | 2/1995 | Milme et al. . | |
| 5,393,926 | 2/1995 | Johnson . | |
| 5,402,501 | 3/1995 | Silfvajt et al. . | |
| 5,475,835 | 12/1995 | Hickey | 395/615 |

(List continued on next page.)

OTHER PUBLICATIONS

"21st Century 'Video Jukebox' XVN Ssytem Debuts in New York", PR Newswire, p. 1130NYTH005, Nov. 1995.
"MCI to Sell Music CDs By Phone, Internet", Newsbytes, Nov. 1995.
Turner, S.R. "Digital Optical Technology—What it can do for Multi–Media", IEE Colloq. (1990) No. 144: Interactive Video Applications, 1990.
"BT Interactive TV Delivering Multimedia Services to the Home", IEE Colloq. (1996), No. 005:Impact of Multimedia Services on the Home Environment, 1996.
Rajapakshe et al. "Video on Demand", http:/www–dse–.doc.ic.ac.uk/~nd/surprise_95/journal/vol4/shr/report.html, pp. 1–15, Jun. 1995.

*Primary Examiner*—Thomas G. Black
*Assistant Examiner*—Charles L. Rones
*Attorney, Agent, or Firm*—Michael W. Starkweather; Valerie L. Starkweather

[57] ABSTRACT

A computer system and method for controlling a media playing device. The system provides a user interface for allowing a user access to media pieces stored in a media database. The interface is also for controlling a media playing device, like a player piano or movie playing video device, that is coupled to the computer to play the accessed or selected piece of media. In one embodiment there is a computer interface that allows a user to display only music that relates to a selected category, like jazz or classical music. Another embodiment allows the user to direct the media playing device to automatically play selected music pieces that are related to a selected music category. Another embodiment allows a user to direct the media playing device to automatically play selected music pieces that are related to the selected music composer or artist.

20 Claims, 8 Drawing Sheets

U.S. PATENT DOCUMENTS

| | | | |
|---|---|---|---|
| 5,488,196 | 1/1996 | Zimmerman | 84/612 |
| 5,510,573 | 4/1996 | Cho et al. | 84/610 |
| 5,517,407 | 5/1996 | Weiner | 364/419.01 |
| 5,523,525 | 6/1996 | Murakami et al. | 84/602 |
| 5,559,707 | 9/1996 | DeLorme et al. | 364/443 |
| 5,583,763 | 12/1996 | Atcheson et al. | 364/551.01 |
| 5,588,842 | 12/1996 | Nishimura et al. | 434/307 A |
| 5,616,876 | 4/1997 | Cluts | 84/609 |
| 5,661,787 | 8/1997 | Pocock | 379/101.01 |

COMPUTER CONTROL SYSTEM AND USER INTERFACE FOR MEDIA PLAYING DEVICES

BACKGROUND OF THE INVENTION

1. Field of the Invention

The present invention generally relates to a computer system and user interface for allowing a user access to a selection of media pieces stored in a media database and for directing and controlling a media playing device to play the selected media piece.

2. Description of the Prior Art

There are many media mediums that have been developed in the last few decades. For example, there are several music mediums, like records, tapes, or CDs, there is the movie video medium, and there is the digital medium. For the purpose of this disclosure and illustration of an embodiment of the invention, the music media and a media playing device such as a player piano will be focused upon. The movie video medium will also be briefly discussed in the specification.

The advent of the player piano was a tremendous breakthrough in the music world. Whether someone was relaxing at home or entertaining a houseful of guests, a player piano would give someone the best of both worlds—a fine acoustic instrument for a pianist to perform on, and a way to enjoy the same vibrant sounds when no pianist was available or willing. Even Hotels, restaurants, clubs and other establishments could have live music on call at all hours of the day or night, using prerecorded music.

Those who are familiar with player pianos of old would not recognize its predecessor, being equipped with a whole selection of newly developed digital electronic musical innovations. The old music scroll containing only one song has been replaced by a computer disc storing many pieces of music. Player pianos can now record music and play it back with such preciseness that all but the most accomplished music listeners could be fooled. Music students can determine if they only want the left or right hand keyboard playing to assist them in learning music pieces. Music pieces can even be electronically transposed into most any key and moved up or down two octaves from the original key by the touch of a button. Even the old metronome has been replaced by a digitized version that can show elapsed time on a liquid crystal display (LCD). And for the recording studios and electronic musicians, the ability to link an acoustic piano with musical instrument digital interface (MIDI) equipment has lifted the king of instruments into a whole new realm.

Examples of patents that are related to the present embodiment of the music medium are as follows, wherein each of the following patents are herein incorporated by reference for the supporting teachings:

U.S. Pat. No. 5,393,926, is a virtual music system. There is included a multi-element actuator that generates a plurality of signals in response to being played by a user. The system also has an audio synthesizer that generates audio tones in response to control signals. There is a memory storing a musical score for the multi-element actuator, the stored musical score including a sequence of lead notes and an associated sequence of harmony note arrays. Each harmony note array of the sequence corresponding to a different one of the lead notes and contain zero, one or more harmony notes. The instrument also includes a digital processor receiving the plurality of signals from the multi-element actuator and generating a first set of control signals therefrom. The digital processor is programmed to identify from among the sequence of lead notes in the stored musical score a lead note which corresponds to a first one of the plurality of signals. The digital processor is also programmed to map a set of the remainder of the plurality of signals to whatever harmony notes are associated with the selected lead note, if any. Moreover, the digital processor is programmed to produce the first set of control signals from the identified lead note and the harmony notes to which the signals of the plurality of signals are mapped. The first set of control signals causes the synthesizer to generate sounds representing the identified lead note and the mapped harmony notes.

U.S. Pat. No. 5,390,138, is a system for connecting an audio object to various multimedia objects to enable an object-oriented simulation of a multimedia presentation using a computer with a storage and a display. A plurality of multimedia objects are created on the display including at least one connection object and at least one audio object. Multimedia objects are displayed, including at least one audio object. The multimedia object and the audio object create a multimedia presentation.

U.S. Pat. No. 5,388,264, is a system for connecting a Musical Instrument Digital Interface (MIDI) object to various multimedia objects to enable an object-oriented simulation of a multimedia presentation using a computer with a storage and a display. A plurality of multimedia objects are created on the display including at least one connection object and at least one MIDI object in the storage. The multimedia object and the MIDI object are connected, and information is routed therebetween to create a multimedia presentation.

U.S. Pat. No. 5,317,732 is a process performed in a data processing system that includes receiving an input selecting one of a plurality of multimedia presentations to be relocated from a first memory to a second memory, scanning the linked data structures of the selected multimedia presentation to recognize a plurality of resources corresponding to the selected multimedia presentation, and generating a list of names and locations within the selected multimedia presentation corresponding to the identified plurality of resources. The process also includes renaming the names on the generated list, changing the names of the identified plurality of resources in the selected multimedia presentation to the new names on the generated list, and moving the selected multimedia presentation and the resources identified on the generated list to the second memory.

U.S. Pat. No. 5,262,940 is a portable audio/audio-visual media tracking device.

U.S. Pat. No. 5,247,126, is an image reproducing apparatus, image information recording medium, and musical accompaniment playing apparatus.

U.S. Pat. No. 5,208,421, is a method and apparatus for audio editing of MIDI files. The invention may be utilized to ensure the integrity of a source MIDI file, a copied or lifted section or a target file by automatically inserting matching note on or note off messages into a file or file section to correct inconsistencies created by such editing. Additionally, program status messages are automatically inserted into source files, copied or lifted sections, or target files to yield results that are consistent with the results that may be obtained by editing digital audio data. Timing information is selectively added or maintained such that MIDI files may be selectively edited without requiring a user to learn a complex MIDI sequencer.

U.S. Pat. No. 5,153,829, is an information processing apparatus. The invention has a unit for displaying on a screen a musical score, keyboard, and tone time information to be inputted. There is also a unit for designating the position of the keyboard, and tone time information, respectively displayed on the display unit. Moreover, the invention includes a unit for storing musical information produced through designation by the designating unit of the position of the keyboard and tone time information displayed on the display unit. Additionally, there is a unit for controlling the display of the musical score, keyboard, and tone time information on the screen of the display unit. The unit also is for controlling the display of a pattern of musical tone or rest on the musical score on the display unit in accordance with the position of the keyboard and tome time information respectively designated by the designating unit. Finally, there is a unit for generating a musical tone by reading the musical information stored in the storage unit.

U.S. Pat. No. 5,142,961, is a method for storage, transcription, manipulation and reproduction of music on system-controlled musical instruments which faithfully reproduces the characteristics of acoustic musical instruments. The system comprises a music source, a central processing unit (CPU) and a CPU-controlled plurality of instrument transducers in the form of any number of acoustic or acoustic hybrid instruments. In one embodiment, performance information is sent from a music source MIDI controller to the CPU, edited in the CPU, converted into an electrical signal, and sent to instrument transducers via transducer drivers. In another embodiment, individual performances stored in a digital or sound tape medium are reproduced at will through the instrument transducers, or converted into MIDI data by a pitch/frequency detection device for storage, editing or performance in the CPU. In still another embodiment, performance information is extracted from an electronic recording medium or live performance by a pitch/frequency detection device, edited in the CPU, converted into an electrical signal, and sent to any number of instrument transducers. The device also eliminates typical acoustic musical instrument delay problems.

U.S. Pat. No. 5,083,491, is a method and apparatus for re-creating expression effects on solenoid actuated music producing instruments contained in musical renditions recorded in MIDI format for reproduction on solenoid actuated player piano systems. Detected strike velocity information contained in the MIDI recording is decoded and correlated to strike maps stored in a controlling microprocessor. The strike maps contain data corresponding to desired musical expression effects. Time differentiated pulses of fixed width and amplitude are directed to the actuating solenoids in accordance with the data in the strike maps, and the actuating solenoids in turn strike the piano strings. Thereafter, pulses of uniform amplitude and frequency are directed to the actuating solenoids to sustain the strike until the end of the musical note. The strike maps dynamically control the position of the solenoid during the entire duration of the strike to compensate for non-linear characteristics of solenoid operation and piano key movement, thus providing true reproduction of the original musical performance.

U.S. Pat. No. 5,046,004 is a system using a computer and keyboard for reproducing music and displaying words to the music. Data for reproducing music and displaying words are composed of binary-coded digital signals. Such signals are downloaded via a public communication line, or data corresponding to a plurality of musical pieces or songs are previously stored in an apparatus, and the stored data are selectively processed by a central processing unit of a computer. In the instrumental music data, trigger signals are existent for progression of processing the words data, whereby the reproduction of music and the display of words are linked to each other. The music thus reproduced is utilized as background music or for enabling the user to sing to the accompaniment thereof while watching the words displayed synchronously with such music reproduction.

U.S. Pat. No. 4,744,281, is an automatic music player system having an ensemble playback mode of operation using a memory disk having recorded thereon a piece of music composed of at least two combined parts to be reproduced separately of each other. The parts being recorded in the form of at least two data subblocks, comprising a first sound generator to mechanically generate sounds when mechanically or electrically actuated, at least one second sound generator to electronically generate sounds when electronically actuated and a control unit connected to the first and second sound generators. One of the two or more subblocks of the data read from the disk is discriminated from another, whereupon the discriminated one of the data subblocks is transmitted to the first sound generator and another data subblock transmitted to the second sound generator. Additionally, the transmission of data to the second sound generator is continuously delayed by a predetermined period of time from the transmission of data to the first sound generator so that the two sound generators are enabled to produce sounds concurrently and in concert with each other.

These incorporated by reference patents reflect the state of the art of which the applicant is aware and are tendered with a view toward discharging applicant's acknowledged duty of candor in disclosing information which may be pertinent in the examination of this application. It is respectfully stipulated, however, that none of these patents teach or render obvious, singly or when considered in combination, applicant's claimed invention.

SUMMARY OF THE INVENTION

It is a feature of the invention to provide a computer user interface. The interface is for providing a user access to media pieces stored in a media database. The interface is also for controlling a media playing device, like a player piano or movie playing video device, that is coupled to the computer to play the accesses or selected piece of media.

It is another feature of the invention to provide a computer interface that allows a user to display only music that relates to a selected category, like jazz or classical. Where the user is then able to direct the media playing device to automatically play the selected music pieces related to the selected music categories.

A further feature of the invention is to provide a computer interface that allows a user to display music selections that are related only to a selected composer, like Duke Ellington or Gershwin. Where the user is then able to direct the media playing device to automatically play the selected music pieces related to the selected music composer.

Another feature of the invention is to provide a computer interface that allows a user to display only music that is related to a selected artist, like Dave Contois, or your own personal recordings. Where the user is then able to direct the media playing device to automatically play the selected music pieces related to the selected music artist.

Another feature of the invention is to provide a computer interface that allows a user to display only music that is related to a selected song or music piece, like Alexander's Rag Time Band or Andante & Rondo Capriciosso, Op. 14. Where the user is then able to direct the media playing device to automatically play the selected music piece.

A feature of the invention is also to provide a computer system that can access others media recording data bases from other sources like internet or world wide web.

Yet a further feature of the invention is to provide a computer system that can access all types of media, like movie videos or music videos, from any multimedia data base source.

It is a further feature of the invention to provide a system for playing media information and implementing a computer as a control means. There is included therein a media playing means for playing media information for a user. Additionally, the control means is coupled to the media playing means. The control means is for allowing a user to automatically control the media playing means in playing the media information. The control means has a display means for displaying information to the user. The control means further has a data storage means for storing first and second categories and a respective first and second data fields, and for enabling data used for enabling the control means to control the media playing means in playing a selected item. Additionally, the control means has a user interface means, displayed on the display means, for displaying to the user at least a first category of media information, a respective first data field listing items related to the first category, and a second category of media information, a respective second data field listing items related to the second category.

The invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, neither is it intended to be limiting as to the scope of the invention in any way.

Other features of the present invention will become more clear from the following detailed description of the invention, taken in conjunction with the accompanying drawings and claims, or may be learned by the practice of the invention.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the use of the accompanying drawings.

DETAILED DESCRIPTION OF THE PREFERRED EMBODIMENT

Charter by the U.S. Constitution

This disclosure of the invention is submitted in furtherance of the constitutional purposes of the United States Patent Laws "to promote the progress of science and useful arts," as stated in Article 1 of the United States Constitution.

Introduction

The first embodiment relates to the use of a computer system and user interface to control which music is to be played upon a player piano. Although one skilled in the art will know how a MIDI system works and how a computer controlled solenoid operated player piano operates, these two topics are provided for background purposes. A second embodiment of the invention relates to the use of a computer system and user interface for allowing a user to select which movie video will be played upon a computer controlled video media playing device or the like. One skilled in the art of computers and video control will understand how the system operates in view of the discussion of the player piano operation.

MIDI Background

Musical Instrument Digital Interface (MIDI) defines an interface for exchanging information between electronic musical instruments, computers, sequencers, lighting controllers, mixers, and tape recorders as discussed in MIDI Manufacturers Association publication entitled, *MIDI 1.0 Detailed Specification* (1990). MIDI is extensively used both in the recording studio and in live performances and has had enormous impact in the areas of studio recording and automated control, audio video production and composition. By itself and in conjunction with other media, MIDI plays an integral role in the application of computers to multimedia applications. In comparison to digital audio, MIDI files take up much less space, and the information is symbolic for convenient manipulation and viewing. For example, a typical three minute MIDI file may require 30 to 60 Kilobytes on a disk, whereas a CD quality stereo audio file requires about two hundred Kilobytes per second, or 36 Megabytes for three minutes. MIDI data may appear as musical notation, graphical piano-roll, or lists of messages suitable for editing and reassignment to different instruments. General MIDI has standardized instrument assignments to greatly motivate the multimedia title producer.

MIDI input and output ports are used to route time-stamped MIDI packets from one media component to another. MIDI ports act as mailboxes for the communication of MIDI packets across address spaces. Many interesting MIDI applications can be created by connecting media components that contain MIDI ports. For example, a MIDI player and a MIDI interface, can be used to play a music device, like an electronic player piano, connected to a computer. MIDI packets are sent from the MIDI player to the MIDI interface. The MIDI interface converts the MIDI packets to MIDI data that is sent to the player piano for playback.

Background for the Operation of a Solenoid Actuated Player Piano

Solenoid actuation of a player piano key is a complex set of mechanical interactions. The mass of the key mechanism is accelerated by the magnetic force created in the solenoid. The solenoid must be dynamically controlled during the entire period of the key strike for two significant reasons. First, the force of the solenoid is non-linear because it changes as the plunger travels. Second, the mass of the key is also non-linear since the key damper increases the mass of the key to accurately recreate music with true reproduction of expression effects.

Each of the eighty-eight keys on a typical player piano is actuated by a vertical solenoid working on the far end of the key. The solenoids are arranged so as to lift the end of the key, and thus accelerate the key mechanism and hammer to strike the string. The force produced by the solenoid is non-linear and can vary as much as ten to one from the start to the end of the strike; of course the shape of the force curve varying according to the solenoid design and construction.

Each piano key includes a damper mechanism which can ride on the key to dampen the string after the strike. The damper interaction takes effect at some point during the key travel, and thus throws an increased mass onto the key when it is engaged. In addition, the damper may be raised by the pianist so that it will not interact with the key, thus allowing the string to sustain after being struck by the hammer.

Each of the solenoid actuators typically consists of a wound coil housed in a steel frame. The solenoid plunger travels within the center of the winding, and exerts mechanical force to lift the piano key. Flexible rubber tips are used between the plunger push-rod and the bottom of the key to reduce the impact noise of the mechanism. However, this also introduces an additional non-linear component into the key travel.

In general terms, it is necessary to "map" the travel of the solenoid into discrete steps of time, or intervals. The mapped information takes into account the foregoing non-linear characteristics of solenoid operation and key movement. Typically, one strike of the solenoid may contain over fifty such intervals. Each of these intervals is then selectively activated by a controlling microprocessor. The microprocessor determining the configuration of the map by analysis of various key interactions. Also, the microprocessor, using instructions stored in memory, translates recorded musical information into driving signals for each solenoid, the object being to reproduce the recorded music as accurately as possible. Essentially, it is the velocity information contained in the recording that is processed into driving signals. Since velocity is the combination of force and mass, the microprocessor is able to determine the force of the solenoid at any given point in time and, in combination with the known key mass, determine the required change in force to produce the desired key acceleration and velocity.

The force required to accelerate the key can be substantial. Therefore, it is essential to provide for a high power strike period, followed by a low power holding period. This allows maximum force during the critical strike period, while still allowing key hold down times without excessive power dissipation.

This system must convert the recorded musical information into discrete driving signals representing strike velocity. The driving signals are then separated in strike signals and hold signals. The strike signals consisting of time differentiated pulses of fixed width and amplitude, the number and timing of the pulses being dependent upon the information in the drive map that controls the recreation of the expression of the musical notes. The pulses are then directed to the solenoid that in turn, causes the strike hammer to strike the piano string. When the strike period is over, a hold signal that comprises pulses of uniform amplitude and timing are directed to the solenoid so that the strike hammer can be held fixed in place until the end of the musical note.

Background for a Computerized Player Piano System

Figure 1:
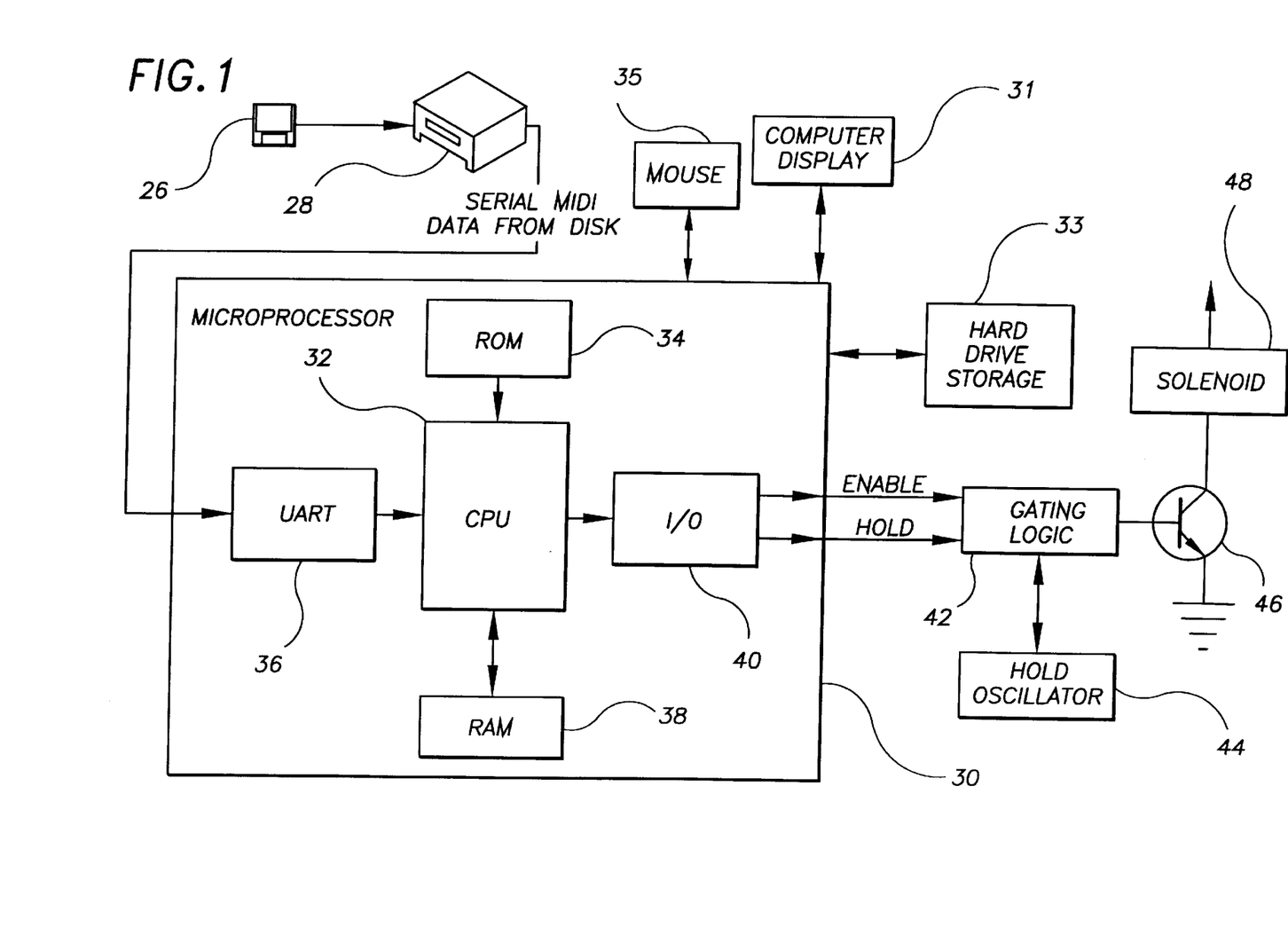
FIG. 1 is a functional block diagram of one type of computer system capable of controlling a media playing device.

FIG. 1 illustrates a functional block diagram of a possible computerized player piano system of the preferred embodiment. A recorded media 26 containing music to be reproduced is read by a playback unit 28. Coupled to playback unit 28 is control microprocessor 30 that selects the strike map for each driving signal 10 corresponding to a particular velocity factor of a hammer to hit a piano string. A core element of control microprocessor 30 is central processing unit (CPU) 32. Coupled to CPU 32 is ROM 34, which is a read only memory, and contains the strike maps for the various velocity factors as well as the operating software for CPU 32. Also coupled to CPU 32 is UART 36, a serial data receiver that receives the serial MIDI data from playback unit 28 and routes it to CPU 32. RAM 38, which contains changeable program data, is also coupled to CPU 32, as are drivers 40, which couple control microprocessor 30 to gating logic 42. Microprocessor 30 is coupled to a computer display terminal 31 for allowing a user to access the information stored in the microprocessor memory and hard drive storage 33. Conventional circuitry and circuit elements are utilized throughout.

Control microprocessor 30 decodes the velocity factor from the recorded media 26 and assigns a particular driving signal 10 to the velocity factor. During the period of strike signal 12, control microprocessor 30 sends an enable signal to gating logic 42. Individual strike pulses 18 activate switch 46 that energizes solenoid 48 according to the strike map. At the end of strike signal 12, control microprocessor 30 switches gating logic 42 to accept hold signal 14 that consists of hold pulses 22 produced by hold oscillator 44.

The ROM 34 contains all programs that the CPU uses to interface with all of the present invention's circuits. This ROM memory also contains all of the programs required to enter, store, retrieve, edit and delete all items in the data base stored on the hard drive 33.

The mouse delivers its coded output to the microprocessor in response to a user actuating buttons and location sensors thereon. In response to receiving the coded output from the mouse, the microprocessor senses the meaning of the output and develops an output representative of its results, that is interpreted by the CPU.

The microprocessor controls the computer display by sending control signals from the CPU to the display. Thus, when the mouse 35 is activated, signals are sent to the CPU where the signals are interpreted. The CPU interpreted signals are sent to the display to cause changes to the information that is displayed thereon. Thus, by double clicking a mouse button at a certain location on the display screen, it is possible to cause many changes to the displayed information. More specifically, data stored in the hard drive can be accessed and displayed, and by properly selecting with the mouse, new stored data can be displayed where the old data was once displayed.

The platform or form that the display uses to present the information that is stored in a data base, for example, is often referred to as a graphical user interface, or user interface. The interface design is often the most important part of a computer system, since a poor interface will prevent all but the most skilled to gain access to the stored information. Poor performance of an interface has caused many products to fail in the market place. Thus, it is essential to provide an interface that is both intuitive and easy to operate. The next sections will primarily deal with the design of the interface used to allow users access to a stored data base through the use of a mouse and cursor.

Computer Interface For A User To Control the Operation of A Player Piano

FIGS. 2 through 6 are graphical illustrations of user interface computer screens that may be used to access the music database and control the operation of a player piano.

It is noted that references to the phrase "data field" is meant to mean a listing of items relating to a category of information found in the data base. For example, the illustrated "Composer" category can list in the data field all of the composers found in the music data base, like Liszt, Debussy, Gershwin, Mendelssohn, etc.

Figure 3:
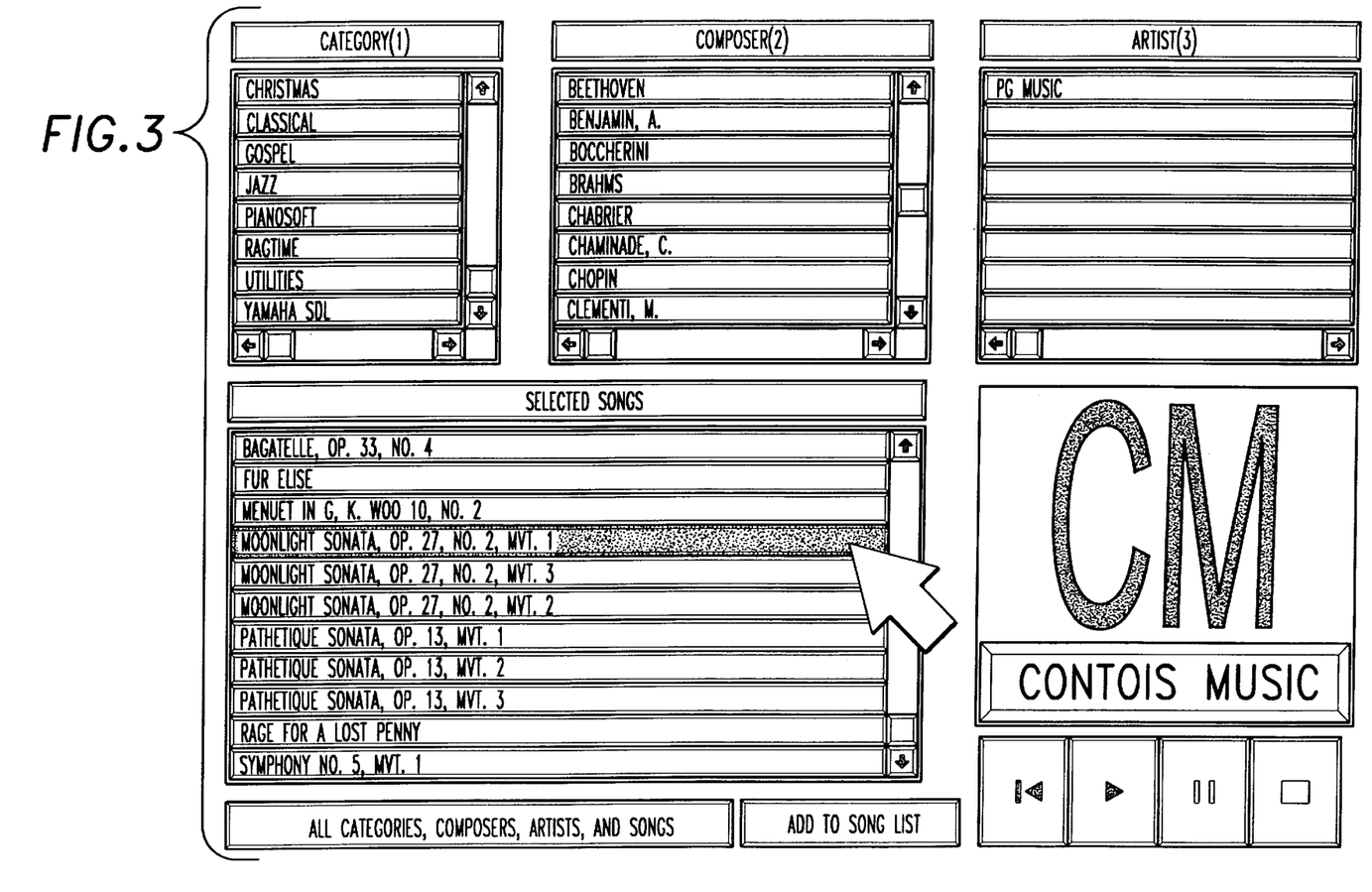
FIG. 3 illustrates a window displaying a control screen for a preferred embodiment.

It is pointed out that term of "selecting" means that a pointer or cursor, which is illustrated as a white arrow in FIG. 3 that is located on a song title, is placed over the desired item while the user usually clicks a mouse button once or twice. The pointer is also known as a selection means.

It is also noted that the word "item" is meant to mean a single piece of data found in the data field related to a selected category. For example, "Jazz" is an item found in the data field related to the category of music Category (labeled as Category for short), or "A Foggy Day" is an item found in the data field related to the category of "Selected Songs."

The interface has a button, labeled "All Categories, Composers, Artists, and Songs," also known as a "select all" button. This button can be activated any time by the user to enable the user to display all of the individual items in each data field that is found in the entire data base. This feature of "select all" is activated when first starting the user interface screen, thus allowing a user to view all of the available data in each data field before making any item selections.

Operation of Data Fields

Displayed on the user interface screens of FIGS. 2, 3, 4, and 6 are four categories of data that may be accessed from the player piano data base. Specifically, the data base categories are labeled as: Category (a short form for music category), Composer, Artist, and Selected Songs. Located below each data base category is a respective data field that list the items or data found in the data base that are associated with the particular category. A description of each data field will now be provided.

The data field labeled as "Category," as the title signifies, displays all of the general music category items found in the data base. For example, blues, Christmas, classical, gospel, jazz, pianosoft, and ragtime music category items are illustrated. Selection of a single or multiple items in this data field provides the user with control over what items may be displayed in the other data fields. For example, in reference to FIG. 3, a user has selected the music category of "Classical." As a result, all of the remaining data fields would replace the currently displayed items in the data field list and display only items found in the music data base that are directly related to the music category of "Classical."

It is pointed out that "displaying a data field" is automatically accomplished by the player piano control system and the relevant software control. Displaying of data is accomplished after a selection of an item is made. First, once a user has selected an item with the mouse, the CPU interprets the coding sent from the mouse and determines which item has been selected and thus highlights the selected item on the display. Second, the player piano control system eliminates the current list or lists of items found in the remaining relevant data fields. Third, the control system will search for all data related to the selected item. Forth, the control system receives signals from the various data storage devices and uses this information to direct the display to display those identified items that will be related to the selected item in the proper data fields.

Figure 2:
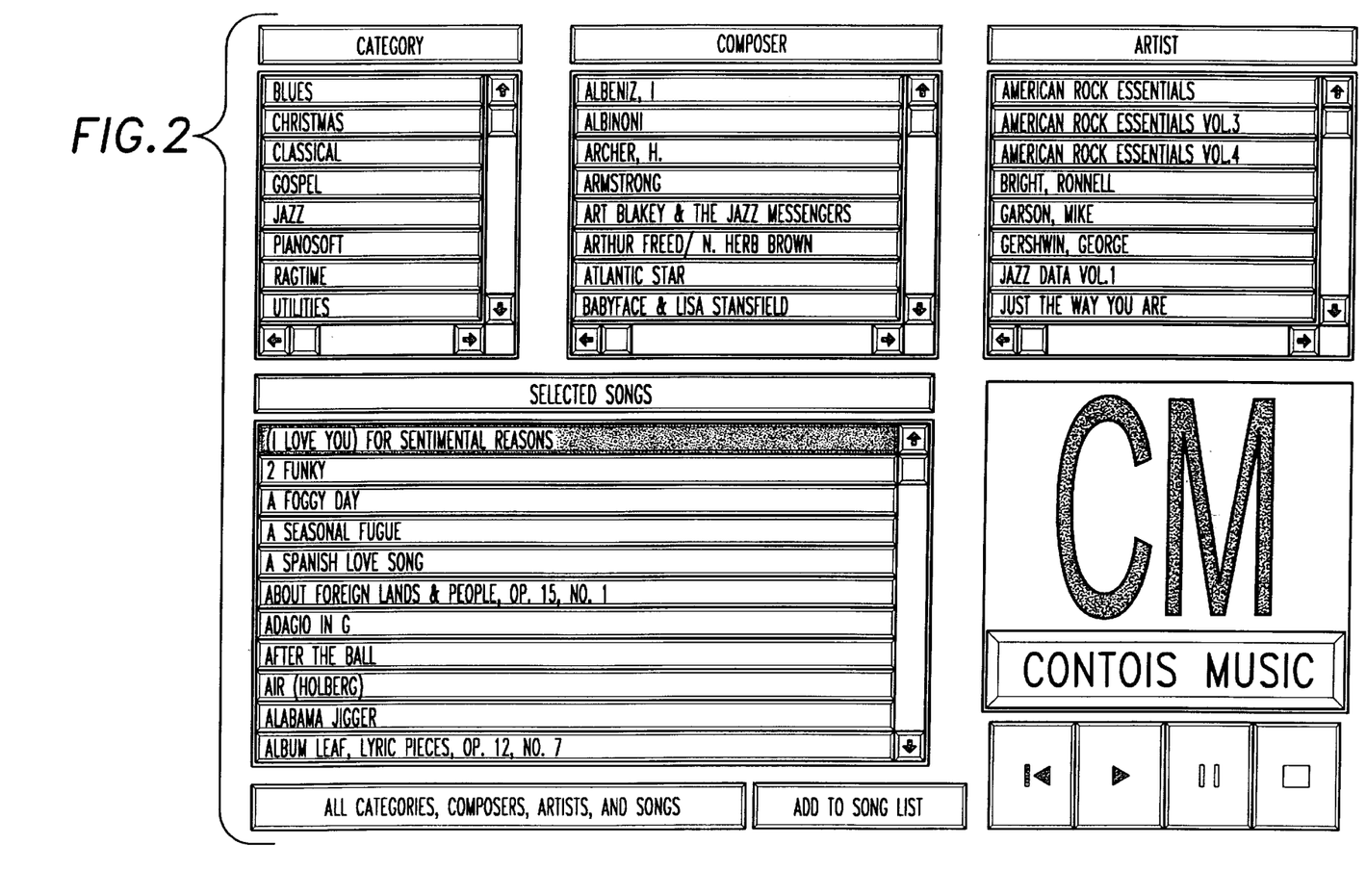
FIG. 2 illustrates a window displaying a control screen for a preferred embodiment.

The data field labeled as "Composer," as the title indicates, can display all of the original composers of each piece of music found in the data. For example, the items of Albeniz, Albinoni, Archer, and Armstrong etc. are illustrated in FIG. 2. This data field also allows the user to control what may be displayed in the other data fields in the same fashion as the music "Category" operation. For example, regarding FIG. 3, by selecting Beethoven as shown, all of the other data fields may be directed to only display data found in the data base that pertains to the composer Beethoven. The user may now display only items in the Artist and Selected Songs categories that are related to Beethoven. By providing a user with these features, hundreds or thousands of items are eliminated from being displayed on the user display, thereby allowing the user to more easily make selections of music to be played upon the player piano.

The "Artist" data field, as the title suggests, would display all of the artists that have played the various pieces of music that are found in the entire music data base. For example, Dave Contois, Phillip Keveren, and PG Music are illustrated. When this data field is selected, it allows the user to control what may be displayed in the other data fields. The Artist data field operated just as the composer and category data fields have. For example, by selecting with the selection means by clicking with the mouse button while the cursor is located over Phillip Keveren, for instance, all of the other data fields may only display data that pertains to this artist if it were the first item selected. In an illustrated example, both the Categories and Composer data fields have already had selections. Thus only the Selected Songs data field will be redisplayed to relate to all of the above selections of Artist, Composer, and Category.

The "Selected Songs" data field, as the title indicates, allows the user to display all of the songs or music pieces found in the music data base. As with the previously described data fields, a user can select at least one of the music pieces in the selected songs data field. As before, once a certain item has been selected, only information related to that selection may be displayed in the other data fields that did not have previously selected items. Besides determining what items may be displayed in the associated data fields, this data field allows the user to select specific Songs that will be played by the attached media playing device, i.e.. the player piano.

Operation of Play Buttons

Further regarding FIGS. 2, 3, 4, and 6, are four media playing device control buttons illustrated on the bottom right side of the interface screen. The operation of each button works much like a typical tape recorder. The first button on the left is typically known to one skilled in the art as the "play" button. This play button is shaped as an arrow pointing to the left. When the play button is actuated, the player piano will begin to play the first selected music piece as indicated in the Selected Songs data field.

The second from the left button, called the rewind button, will cause the selected item, the song "All I Ask of You," to stop playing and "rewind" the music selection. The rewind button is an arrow pointing to the right. By rewind, it is meant to cause the music to stop at the current frame, lets say frame 80 of the music piece, and move back a given number of music frames and potentially all the way back to the beginning. As with a tape recorder, the amount of time that the rewind button is actuated will control how far back in the music the user wants to restart the player piano.

The next button is typically known as the "pause" button. The pause button is indicated by two vertical lines. This button allows the user to temporarily suspend the playing of the player piano. Upon activating the pause button again or by reactuation of the play button, the player piano will start playing at the exact spot that it had been stopped.

The last button on the right is typically recognized as the "stop" button. The stop button is indicated by a square shape. This button is used when the user is finished listening to the selected piece of music and is no longer interest in listening any further. To restart the player piano another music piece is generally selected from the music data fields and the start button is then reactivated.

Process of Creating Lists of Songs

Another feature of the preferred embodiment regards the creation of a specialized list of music pieces to be played on the player piano. In operation, once a piece of music is selected, a user may activate the button labeled "Add to Song List," which is located at the bottom center of each screen. By using this button, a user can create their own personal record album or compact disk that contains only those songs that have been individually selected. Thereby, the player piano can be directed to play each song one after the other in sequence or in a random order.

Figure 4:
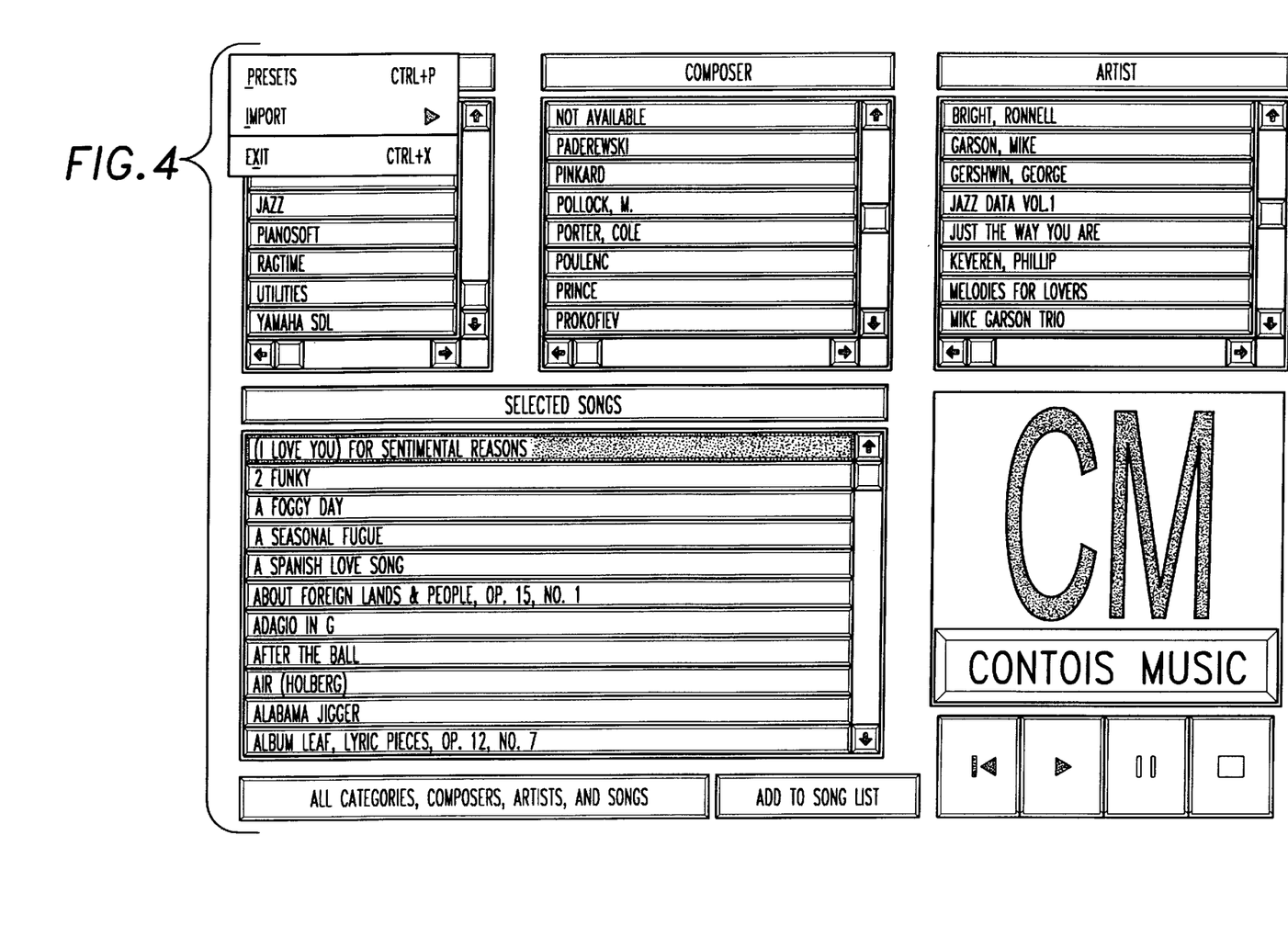
FIG. 4 illustrates a window displaying a control screen for a preferred embodiment.

Once a list of songs has been selected using the "Add to Song List" button, the user can view, customize, and edit the created list. A user selects "File" from the menu bar as illustrated in FIG. 4, and selects "Song List" or by actuating the control and S keys simultaneously.

Figure 5:
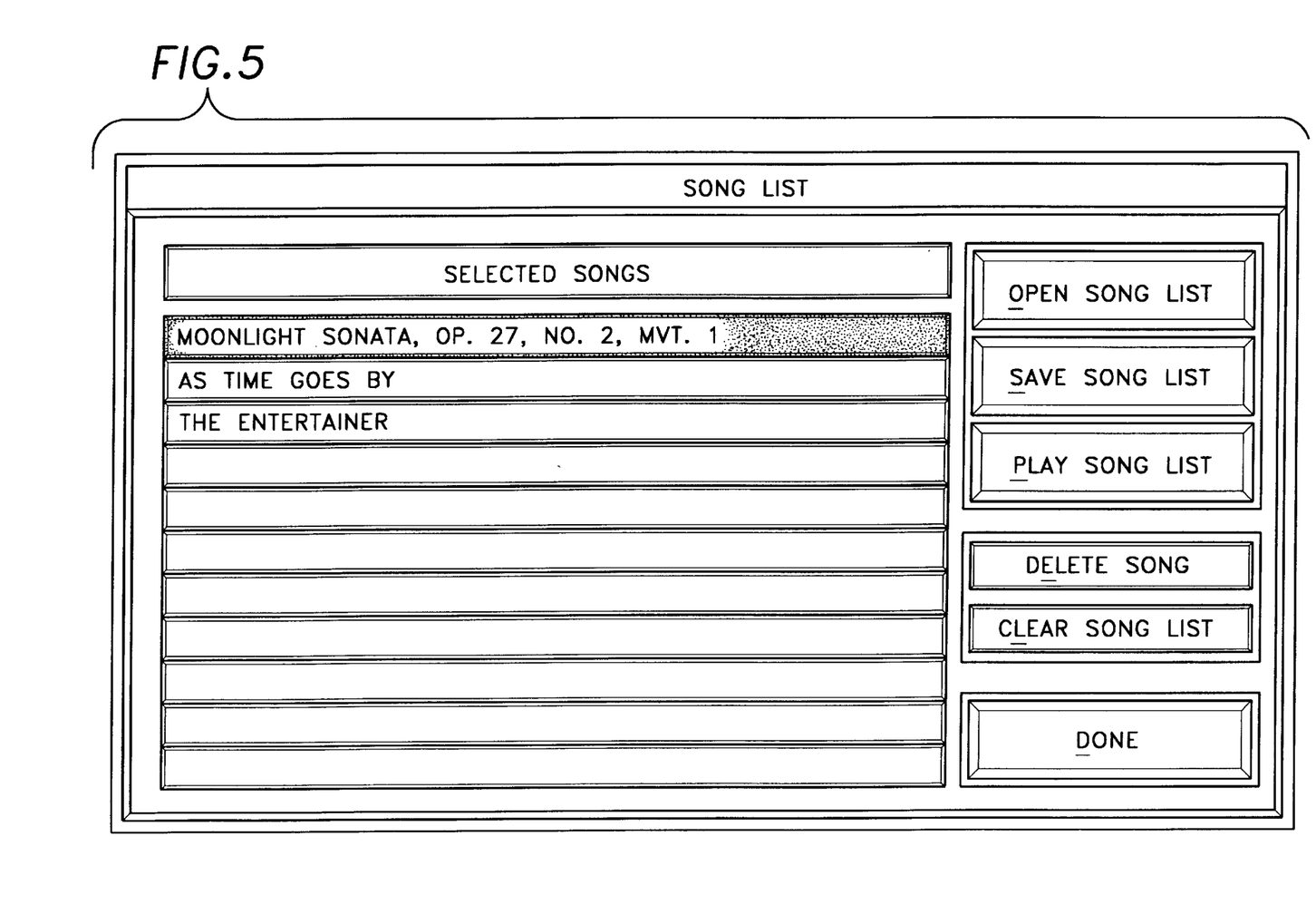
FIG. 5 illustrates a window displaying a basic Song List screen with the associated operational buttons.

FIG. 5 illustrates a basic Song List screen with the associated operational buttons. Note, that the songs listed under the Selected Songs heading (Moonlight Sonata, As time Goes By, and The Entertainer) were recently added to the song list. The user has several options to use on these newly listed songs. First, by activating the "Save Song List" button, the user could save the song list and give the list a name that could be used latter to both identify and access this newly created list. Second, by activating the Play Song List button, the user could also play the displayed list of songs on the player piano without ever having saved the created song list. Third, the user could edit the song list by using the "Delete Song" button, thereby eliminating any song that was highlighted or selected.

There are additional features provided by the Song List screen or window. For instance, the user could select the "Open Song List" button to get a list of all previously created song lists. The user could either edit individual song lists by eliminating or adding individual songs or play selected song lists. When a user wishes to create a new song list from scratch, the "Clear Song List" button would be selected, which would clear the screen of any listed song titles.

The feature of creating your own music lists allows the every-day computer user to create their own music albums or collections and not be limited by what is prepackaged by music companies. For example, the user can now create whole musical events, like a list of children's birthday party music, teenager party music, young couples wedding music, old couples anniversary music, or all renditions of "A Foggy Day" by Dave Contois performed in the year 1995. It is even possible for a restaurant to program music for an entire evening beginning with lively after work music for happy hour and gradually changing the song selections to be quieter for the dinner crowd.

Figure 6:
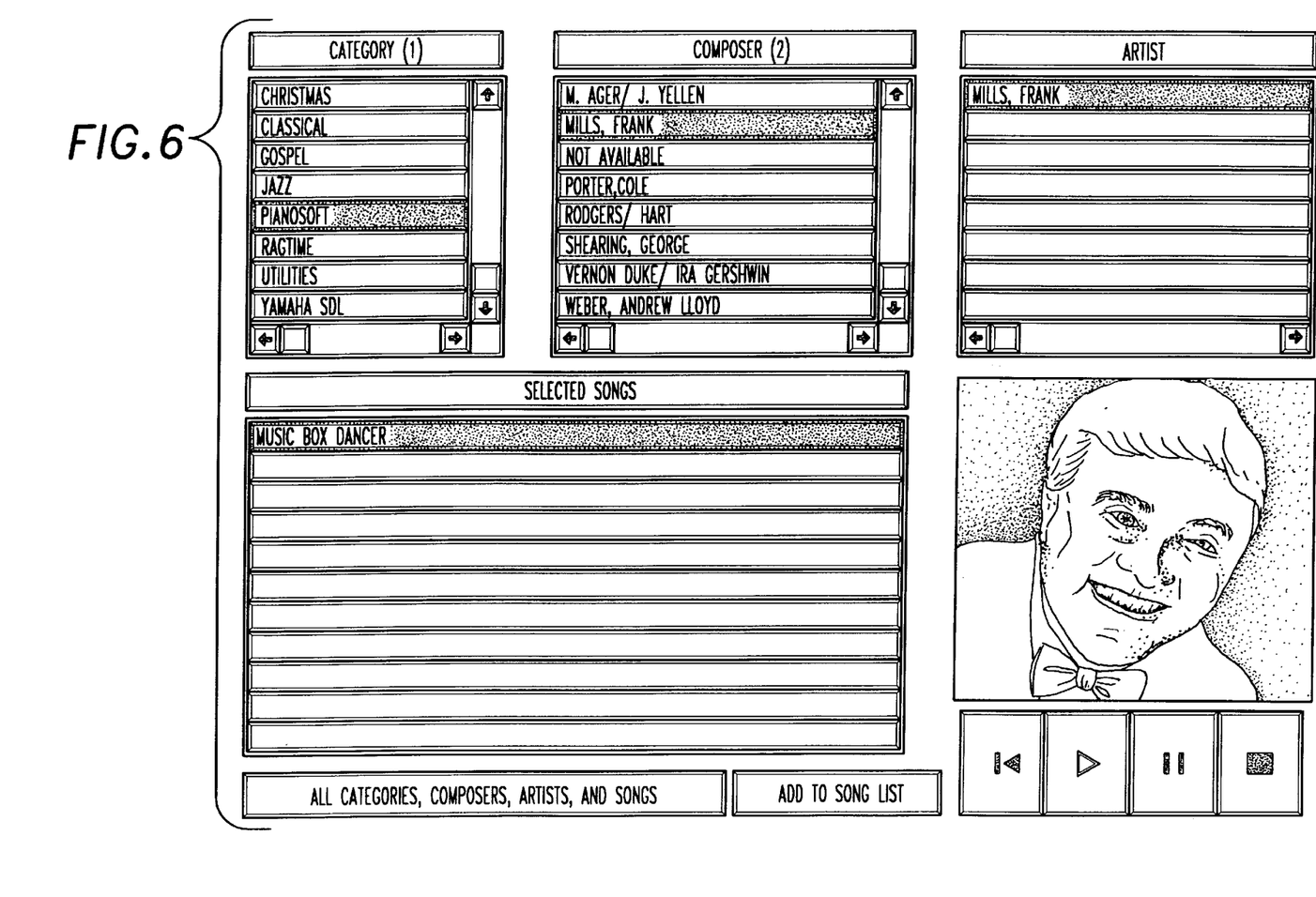
FIG. 6 illustrates a control window displaying a nested graphical window.

Regarding FIG. 6, there is a window illustrating the operation of the preferred embodiment and the use of a graphics window. As shown in the bottom right portion of the window above the play buttons, there is a graphics window. In operation, once a song title is selected to be played upon the player piano, the graphic window will display a picture of something associated with the selected piece of music. In this case, there is illustrated a portrait of the Artist and Composer, Frank Mills.

Overview of the Operation of the Preferred Embodiment

Figure 7:
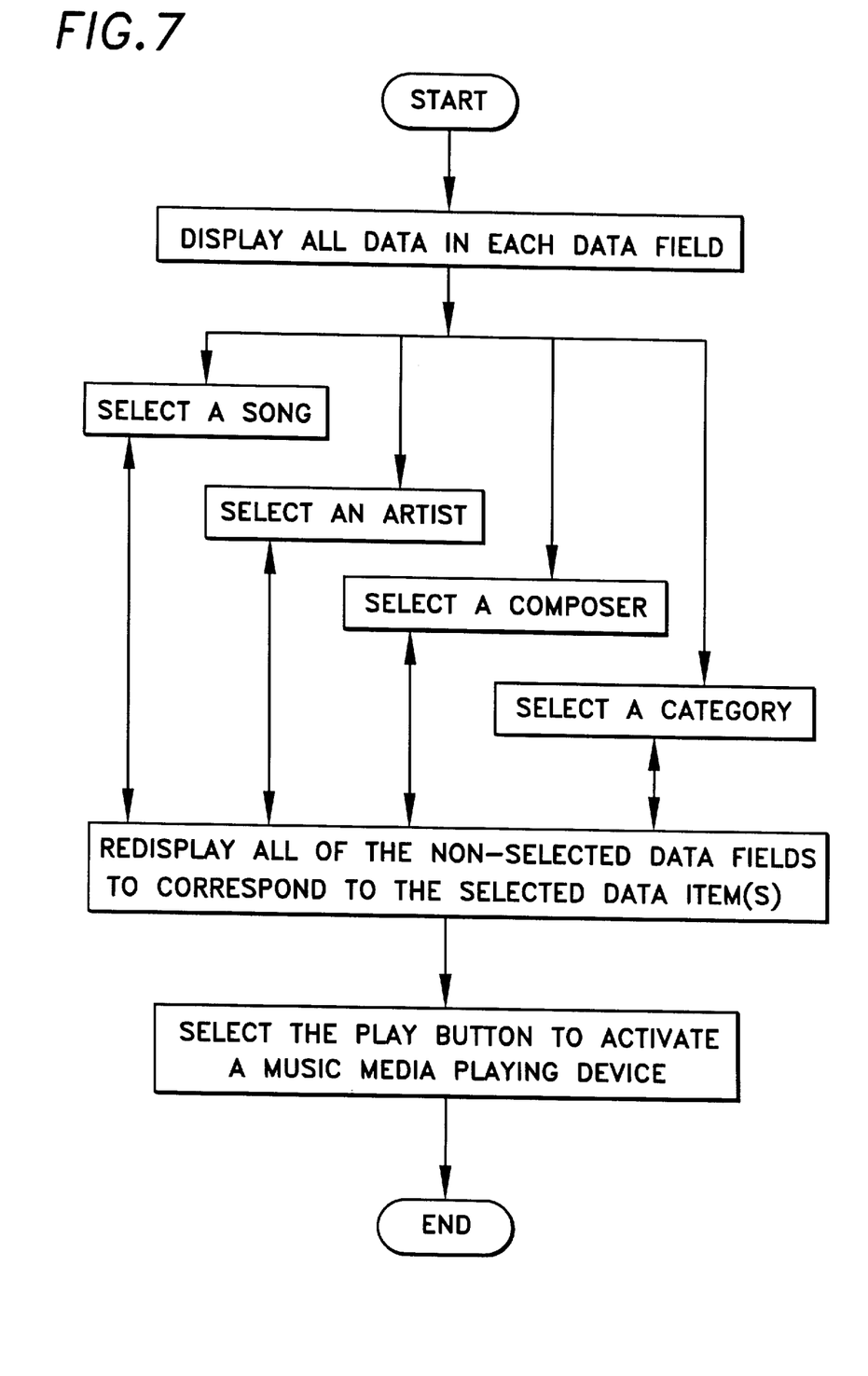
FIG. 7 is a partial flowchart illustrating an embodiment of the invention related to a player piano and a music data base.

FIG. 7 is a partial flow chart of the general sequence of operation for the graphical user interface of FIGS. 2, 3, 4 and 6. Upon first accessing the interface window, all of the data in each data field will be displayed. More precisely, all of the data can be viewed by scrolling through the individual data fields. The user is then able to select what items are needed to find the specific song titles that are desired to be played upon the player piano. As illustrated, there is shown an interaction between the selection of an item in a data field and the redisplaying of all non-selected data field items to correspond to the selected items. The interactive process may continue with multiple rounds of selection and de-selection stages. Finally, the user will have a song title selected and will then select the play button to activate the music media playing device, or player piano.

Computer Interface For A User To Operate A Video Player

Figure 8:
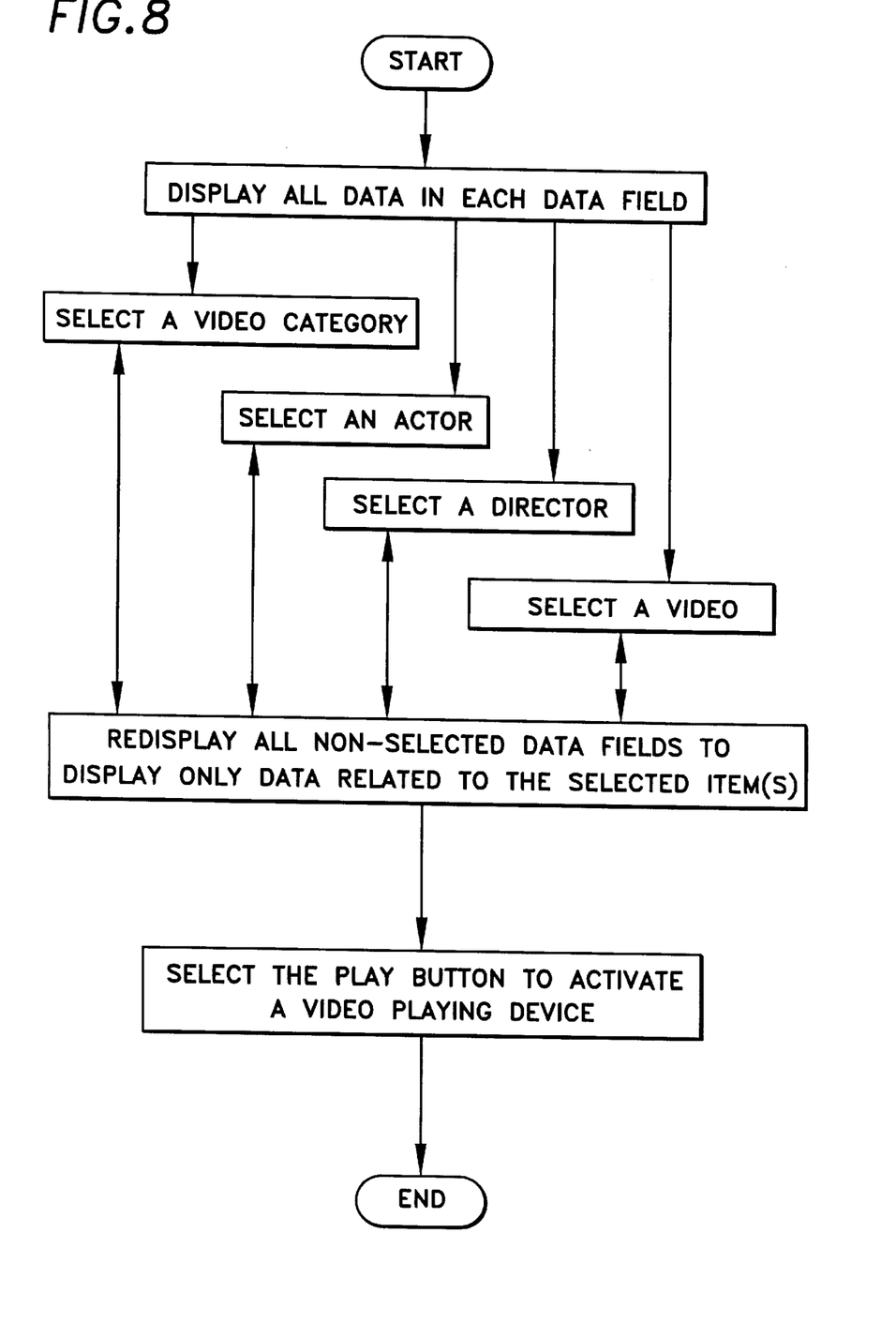
FIG. 8 is a partial flowchart illustrating another embodiment of the invention related to a movie video media and a videos data base.

Reference is made to FIG. 8 for the following discussion. Specifically, there is a partial flow chart of the general sequence of operation for the illustrated embodiment related to a video player. Just as the previous embodiment related to the control of a player piano, the embodiment of the video player anticipates the operation of a substantially similar interface screen. However, the difference being that the new interface screen will have different categories with different data fields of items. Specifically, the paired categories and data fields would be labeled as: Video Category, Actor, Director, and Selected Videos.

The illustrated data fields are as follows: The "Movie Category" data field allows the user to view a complete list of all of the movie categories found in the accessed movie videos data base. For example, items such as Westerns, War, Romance, Comedy, and Documentaries might be listed. Similarly, for the "Actor" data field, items such as Robin Williams, and Sylvestor Stalone may be listed. For the "Directors" data field you would find items like Penny Marshall, or Ron Howard. Of course, the data field of "Video" would show the titles of videos found in the data base, like Hook, or Die Hard.

The operation of the Video user interface in controlling the operation of a video player device is substantially like the operation of the player piano operation and control. Specifically, by selecting either single or multiple items in each data field a user may narrow down the listed items in the Video category to allow the user to find a movie video for viewing. Whereby, the user may then use the same four control tape recorder-like buttons as with the player piano interface. The main differences from the music data base interface is that there are different data field titles and that different information is stored in the video data base.

Remarks About The Preferred Embodiment

It is noted that the selective displaying of data field items is sensitive to the item selection sequence. For example, if a Composers item was the first selected item, then the Categories items would be redisplayed to show only items related to the selected composer. For this reason, to assist the user to keep track of which category was selected in what order, a number in parentheses is displayed next to the category title after an item has been selected in that data field. Specifically, referring to FIG. 3, Category has a (1) next to it since Classical was the fist selected item, Composer has a (2) next to it to indicate that Beethoven was the second item selected, and Artist has a (3) next to it to indicate that PG Music was the third item in the sequence of selection.

It is possible to select songs in a any order of categories. For example, it is possible to select songs in the order of a Composer, then an Artist, followed by a Category. It is even provided for a user to take back a selection with out starting from the beginning of the selection sequence. This is typically called "deselecting and item." As the phrase indicates, the third item selected can be deselected, then the second item could be deselected. In this situation, all of the remaining data fields would only have items related to the first selected item and not the other two previously selected items that had been canceled. This operation allows the use a large degree of flexibility in choosing songs to be played on the player piano.

The user interface embodiment further provides for the user to select multiple items in a given data field in a very similar fashion to the selection on single items. Thus, for example, it is possible to select both classical or jazz music composed by both Liszt or Duke Ellington, and being played by Dave Contois.

Variations In The Preferred Embodiment

Although this embodiment focuses upon the application of the software to control a player piano or video player, one skilled in the art will realize that this software interface could be used on any media playing device where a user needs to select what media item is to be played from a vast media data base. For example, it is contemplated to operate an electric guitar, a computer controlled multimedia system, a pipe organ, a television, a movie video player, or a computer screen.

The current embodiment of the invention also anticipates the use of the invention to play all types of media information that needs to be accessed by the user. For example, other media information that can be accessed using the present invention are: music videos, homemade videos, computer games, or software programs (accounting, drawing, writing, etc.).

Although the embodiment only discusses the process of selecting a single piece of music or video it is easily understood that a user could have the music or video playing device to play a long pre-selected list of selected items in either a random or sequential order.

The preferred embodiment of the invention discusses the control of only a single media playing device, like a player piano. However, one skilled in the art would easily understand how to simultaneously control several media playing devices with the same control system in view of this disclosure. For example, the coordination of the control of a player piano along with a music video is contemplated.

One skilled in the art will also understand that a computer hard drive storage device is not the only storage medium for storing accessible media data. For example, additional media data bases could be found on a world wide web, a satellite receiver, or an internet link system.

Although there are four specific data fields displayed in FIG. 2, it is also contemplated to have different and additional data fields. For example, another category and related data field could display a list of what year the music was created. Thus, for example, a user could request jazz music created on or after 1980 and before 1990.

It is noted that the embodiment of the invention discusses the use of a standard known computer, where in fact all components of the computer can be replaced with any new advancing technologies, like holographics or voice activated systems and still not depart from the intent of the invention of allowing easier user access to the underlying media data base information.

One skilled in the art will recognize that it is not essential to have the computer system separate from the media playing device. It is conceivable to have the computer system physically incorporated in part or in whole into the media playing device.

It is equally anticipated that a skilled artisan would be able to provide variations to the graphics window, as shown in FIG. 6. For example, it is anticipated to provide a motion picture of the artist playing the selected song. It is equally anticipated, for example, to provide a view of the musical score in the graphics window as the music is being played.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Patent is:

1. A computer user interface menu selection process for allowing the user to select music to be played on a music device controlled by a computer, comprising the steps of:

a) simultaneously displaying on a display device, at least two individual data fields selected from music categories, composers, artists, and songs;

b) selecting at least one item from at least one of the data fields;

c) in response to step b), redisplaying all data fields not having an item selected therefrom with data related only to the at least one item selected in step b), and simultaneously maintaining all items originally displayed in the data fields with at lest one item selected therefrom;

d) selecting an item in the songs data field in response to step c), and e) playing the selected song item from step d) on the computer responsive music device.

2. The process of claim 1, wherein the step of playing the selected song item comprises:

a) activating a play button located on the computer screen;

b) sending a data stream from the computer to the computer controlled music device in response to step a) for controlling the playing of the selected song;

c) receiving the data stream by the computer controlled music device from the computer; and d) playing the selected song item on the computer controlled music device.

3. A method of enabling a user to select a song, which is stored in a music data base, that will be played on a player piano that is controlled by a computer, wherein the method comprising the steps of:

a) simultaneously displaying, on a display device, both a songs data field that displays a list of song titles found in the music data base, and a music categories data field that displays a list of music category items of the song titles found in the music data base; and b) selecting, by the user, a single music category item from the music category data field;

c) redisplaying the songs data field, and not the music category data field which still displays the list of music category items as previously displayed, to display only song titles that are related to the selected music category item, in response to performing step b);

d) selecting, by the user, a song that is displayed in the songs data field after performing step c); and e) playing the selected song title on the player piano.

4. The method of claim 3, wherein the displaying step further comprises:

displaying a composers data field for displaying a list of composers of the song titles found in the music data base.

5. The method of claim 4, further comprising the steps of:

f) selecting, by the user, a composer from the composers data field before performing step e); and g) redisplaying the songs data field with only song titles relating directly to both the selected composer and music category, in response to performing step f) and before performing step e).

6. The method of claim 5, wherein the displaying step further comprising:

displaying an artists data field for displaying a list of artists of the song titles found in the music data base.

7. The method of claim 6, further comprising the steps of:

h) selecting, by the user, an artist listed in the artists data field before performing step e); and i) redisplaying the songs data field only with song titles relating to the selected artist, composer, and category, in response to performing step h).

8. The method of claim 7, wherein the step of playing, further comprises:

a) selecting, by the user, a play button that will enable the player piano to receive a data stream that will control the operation of the player piano in playing the selected song title.

9. The methods of claim 8, wherein the step of playing, further comprises:

b) selecting, by the user, a pause play button that will temporarily suspend the player piano from receiving the data stream;

c) selecting, by the user, the pause play button a second time to enable the player piano to continue to receive the data stream.

10. The method of claim 9, wherein the step of playing, further comprises:

d) selecting, by the user, a stop play button that will disable the player piano from receiving the data stream.

11. A system for playing media information on a media playing means, the system comprising:

a) the media playing means for playing the media information for a user where the playing means is capable of playing musical sound; and b) control means, coupled to the media playing means, for allowing the user to select media information and to automatically control the media playing means in playing the selected media information, the control means having:

b1) data storage means for storing the media information, the media information including:

1) a first category of media information and a respective first data field containing a first list of items found in the data storage means that are related to the first category, and 2) a second category of media information and a respective second data field containing a second list of items found in the data storage means that are related to the second category;

b2) display means for simultaneously visually displaying the first and second category of media information to the user; and b3) user interface means, displayed on the display means, for displaying the first and second list of items so the user may i) select at least one item from the first list of items and in response redisplaying the second list of items with items that are related only to the at least one item selected in the first list, and simultaneously maintaining all items originally displayed in the first list; and ii) play the selected item from the first list on the media playing means, which is a capable of playing music.

12. The system of claim 11, wherein the user interface means further comprises:

selection means for allowing the user to select a first data field item and thereby automatically change the second data field to display second data field items that are only related to the selected first data field item.

13. The system of claim 12, wherein the media information further includes a third category of media information and a respective third data field containing a third list of items related to the third category;

the user interface means displays the third list of items so the user may select items therefrom for allowing the user to control what media information will be played on the media playing means; and the selection means will automatically change the third data field to display third data field items that are both i) only related to the selected first data field item and ii) are found in the data storage means.

14. The system of claim 13, wherein the media information includes movie videos and the media playing means is a video player.

15. The system of claim 13, wherein the first category is a music category, and the first list of items is a list of music categories found in the data storage means, and the second category is a songs category, and the second list of items is a list of song titles found in the data storage means.

16. The system of claim 15, wherein the third category is a composers category, and the third list of items is a list of music composers found in the data storage means.

17. The system of claim 16, wherein the media information includes piano music and the playing means is a player piano.

18. The system of claim 17, wherein the storage means is a hard disk drive for a computer.

19. The system of claim 18, wherein the data storage means is located remote to the display means and media playing means.

20. The system of claim 19, wherein the display means is a computer monitor.

* * * * *